(12) United States Patent
Sun et al.

(10) Patent No.: US 12,310,277 B1
(45) Date of Patent: May 27, 2025

(54) SEED-ON-PAPER-BAND PACKAGING MACHINE SUITABLE FOR PLOT BREEDING AND WORKING METHOD THEREOF

(71) Applicant: SHANDONG ACADEMY OF AGRICULTURAL MACHINERY SCIENCES, Shandong (CN)

(72) Inventors: Yongjia Sun, Jinan (CN); Yitian Sun, Jinan (CN); Jingxin Shen, Jinan (CN); Fan Yang, Jinan (CN); Jinghong Zhu, Jinan (CN); Qingqing Dou, Jinan (CN)

(73) Assignee: SHANDONG ACADEMY OF AGRICULTURAL MACHINERY SCIENCES, Jinan (CN)

(*) Notice: Subject to any disclaimer, the term of this patent is extended or adjusted under 35 U.S.C. 154(b) by 0 days.

(21) Appl. No.: 18/718,133

(22) PCT Filed: Jan. 22, 2024

(86) PCT No.: PCT/CN2024/073399
§ 371 (c)(1),
(2) Date: Jun. 10, 2024

(87) PCT Pub. No.: WO2025/020480
PCT Pub. Date: Jan. 30, 2025

(30) Foreign Application Priority Data

Jul. 21, 2023 (CN) .......................... 202310900582.8

(51) Int. Cl.
*A01C 1/04* (2006.01)

(52) U.S. Cl.
CPC ........ *A01C 1/042* (2013.01); *A01C 2001/048* (2013.01)

(58) Field of Classification Search
CPC .......... B65B 15/04; B65B 25/02; A01C 1/04; A01C 2001/048
See application file for complete search history.

(56) References Cited

U.S. PATENT DOCUMENTS 1,364,050 A * 12/1920 Gray ...................... A01C 1/042
53/580
3,722,137 A * 3/1973 Kesinger ................ A01G 9/085
425/464

(Continued)

FOREIGN PATENT DOCUMENTS

CN       206442685 U       8/2017
CN       108112319 A       6/2018

(Continued)

OTHER PUBLICATIONS

Apr. 3, 2024 International Search Report issued in International Patent Application No. PCT/CN2024/073399.

(Continued)

*Primary Examiner* — Joshua G Kotis
*Assistant Examiner* — Scott A Howell
(74) *Attorney, Agent, or Firm* — Oliff PLC

(57) ABSTRACT

A seed-on-paper-band packaging machine includes: a seed delivery mechanism, including a seed filling assembly and an air-suction-type seed metering device connected sequentially, a plurality of suction holes are arranged on an outer wall of the seed metering device at equal intervals along a circumferential direction thereof; a seed metering baffle is arranged on one side of the suction hole at a lowest point of the seed metering device facing the rotating direction thereof, to block seeds and reduce a speed of the seeds in a horizontal direction to zero; a paper-band releasing and (Continued)

collecting mechanism, a paper-band glue spraying and sealing mechanism, a seed-on band drawing mechanism and a frame.

9 Claims, 5 Drawing Sheets

(56) References Cited

U.S. PATENT DOCUMENTS

| | | | | | |
|---|---|---|---|---|---|
| 3,933,239 | A | * | 1/1976 | Yoshida | A61J 3/074 198/384 |
| 4,283,880 | A | * | 8/1981 | Fjeldsa | A01C 1/046 47/9 |
| 4,780,988 | A | * | 11/1988 | Mielke | A01G 24/48 131/369 |
| 5,996,768 | A | * | 12/1999 | Boyce | B65G 47/1471 198/397.03 |
| 6,578,317 | B1 | * | 6/2003 | Ahm | A01C 1/042 47/56 |
| 6,681,521 | B1 | * | 1/2004 | Holloway | A01C 1/042 47/56 |
| 2003/0150556 | A1 | * | 8/2003 | Miller | A01C 1/044 156/276 |
| 2010/0115892 | A1 | * | 5/2010 | Aylward | B65B 35/26 53/473 |
| 2013/0118638 | A1 | * | 5/2013 | Hopkins | A61J 3/074 141/234 |
| 2013/0206913 | A1 | * | 8/2013 | Stevenson | A61J 1/035 43/131 |
| 2015/0230395 | A1 | * | 8/2015 | Choe | A01C 1/044 156/352 |

FOREIGN PATENT DOCUMENTS

| | | |
|---|---|---|
| CN | 109757160 A | 5/2019 |
| CN | 110214499 A | 9/2019 |
| CN | 111527831 A | 8/2020 |
| CN | 112789967 A | 5/2021 |
| CN | 117063665 A | 11/2023 |
| WO | 2022/247384 A1 | 12/2022 |

OTHER PUBLICATIONS

Apr. 3, 2024 Written Opinion issued in International Patent Application No. PCT/CN2024/073399.

* cited by examiner

SEED-ON-PAPER-BAND PACKAGING MACHINE SUITABLE FOR PLOT BREEDING AND WORKING METHOD THEREOF

This application claims priority benefits to Chinese patent application filed with the China National Intellectual Property Administration (CNIPA) on Jul. 21, 2023, with application number 202310900582.8, entitled "a seed-on-paper-band packaging machine suitable for plot breeding and a working method", the entire contents of which are incorporated herein by reference.

TECHNICAL FIELD

The present invention relates to the technical field of agricultural machinery, in particular to a seed-on-paper-band packaging machine suitable for plot breeding and a working method thereof.

BACKGROUND

Plot breeding is a basic method to cultivate and popularize fine crop varieties, develop improved varieties and improve crop yield. Plot sowing requires that in the specified length and width of plot area, a certain amount of seeds should be evenly and accurately sown to each row, the sowing in the plot should be uniform, there should be no seeds in the interval of the plot, and there should be no mixed planting in different plots.

In order to improve the crop yield and ensure food security, new varieties need to be cultivated continuously, and the most important way of crop breeding is plot test breeding. At present, crop plot breeding mostly adopts artificial precision sowing or traditional large-scale sowing in field. The former needs a lot of manpower and is inefficient, while the latter wastes resources greatly and has insufficient precision.

In order to improve the precision of seed metering, the Chinese Patent Application publication number CN206442685U has developed and provided an air-suction-type single-seed metering device, which uses a negative pressure to absorb seeds onto the seeding disk, and when the seeding disk rotates to a non-vacuum area, the seeds fall under gravity, which can only be used to solve the problem of missed seeding and reseeding. In the process of falling, the seed is easy to be thrown out due to inertia generated by following the rotation of the seeding disk, and cannot fall vertically under the action of gravity. Thus, it cannot be used for precision control of seeding spacing (i.e. plant spacing) in actual plot breeding work, and still needs manual control of plant spacing during seeding.

SUMMARY

Aiming at the defects existing in the prior art, the present invention aims to provide a seed-on-paper-band packaging machine suitable for plot breeding and a working method thereof, which can uniformly package seeds on a degradable paper band through an arrangement of a seed metering baffle and a seed-on band drawing mechanism, thereby not only ensuring the stability of the number of seeds in a single hole and the plant spacing, but also effectively reducing the missed sowing, the repeated sowing and the seed loss rate, realizing automatic packaging of seeds, greatly improving the breeding efficiency and accuracy, solves the problems of low efficiency and poor seeding precision of the existing plot breeding mode.

In order to achieve the above objects, the present invention is achieved through the following technical solution:

In a first aspect, the present invention provides a seed-on-paper-band packaging machine suitable for plot breeding, comprising:

a seed delivery mechanism, comprising a seed filling assembly and an air-suction-type seed metering device which are sequentially connected, wherein a plurality of suction holes are arranged on an outer wall of the seed metering device at equal intervals along a circumferential direction of the seed metering device; a seed metering baffle is arranged on one side of one suction hole of the plurality of suction holes that is at a lowest point of the seed metering device facing the rotating direction of the seed metering device, so as to block seeds and reduce a speed of the seeds in a horizontal direction to zero;

a paper-band releasing and collecting mechanism, being positioned below the seed delivery mechanism and comprising a first reel used for releasing the paper band and a second reel used for winding the seed-on band;

a paper-band glue spraying and sealing mechanism, being positioned above the paper-band releasing and collecting mechanism and at a side of the seed delivery mechanism adjacent to the first reel, and being used for spraying glue onto the paper band;

a seed-on band drawing mechanism, being positioned between the two reels, and being used for drawing, extruding and drying of the seed-on band; and a frame, playing a supporting role, and universal wheels are arranged at a bottom of the frame.

As a further implementation, the frame is further provided with a control mechanism for controlling the operation of the seed delivery mechanism, the paper-band releasing and collecting mechanism, the paper-band glue spraying and sealing mechanism and the seed-on band drawing mechanism, and a plurality of sensors for monitoring the seed delivering quantity and states of the paper band.

As a further implementation, the seed filling assembly comprises a seed bin and a seed chamber, wherein the seed bin comprises a plurality of bin chambers, each bin chamber is respectively provided with an electrically controlled valve; a bottom of the seed bin is communicated with the seed chamber, and part of the outer wall of the seed metering device is positioned in the seed chamber.

As a further implementation, a remaining seed collector is arranged at a bottom of the seed chamber, an electrically controlled valve is arranged at the bottom of the seed chamber, a seed emptying air-valve for blowing air to the outer wall of the seed metering device is arranged above the seed metering device, a seed receiving device is arranged below a side of the seed metering device, and an inner cavity of the seed metering device and the seed emptying air-valve are connected with an air source.

As a further implementation, a pneumatic interrupter is arranged inside the seed metering device, the pneumatic interrupter is rotatably mounted on a transmission shaft of the seed metering device through a bearing, and the pneumatic interrupter is contacted with the suction hole of the lowest point of the seed metering device through a steel ball capable of rotating in situ, so as to block a communication between the suction hole of the lowest point of the seed metering device and an inner cavity of the seed metering device.

As a further implementation, the second reel is driven by a servo motor, the paper band released from the first reel is wound up by the second reel after delivering the seeds on the paper band, and the first reel and the second reel are both provided with a transmission shaft for guiding and positioning the paper band and a sensor for monitoring the state of the paper band.

As a further implementation, the seed-on band drawing mechanism comprises a tractor and a dryer which are sequentially arranged, wherein the tractor comprises two groups of sponge rollers which are oppositely arranged, and the two sponge rollers are driven by a servo motor to draw and extrude the seed-on band, and provide assistance in gluing of the seed-on band.

As a further implementation, the seed metering device is positioned right above the paper band and a distance therebetween is not larger than 1 cm.

In a second aspect, the present invention provides a working method of a seed-on-paper-band packaging machine suitable for plot breeding, specifically as follows:
- placing seeds of different kinds correspondingly in numbered bin chambers;
- drawing a paper band upward from a first reel and sequentially passing through a paper-band glue spraying and sealing mechanism, a seed metering device, a drawing mechanism and a dryer, and then connecting the paper band to a second reel;
- manually setting seed quantity, plant spacing, the number of a required bin chamber of the seed bin and variety number information of packaging on the control mechanism;
- opening, by the control mechanism, the electrically controlled valve of the bin chamber of a corresponding number to enable the seeds to enter the seed chamber;
- performing, by the seed metering device, the seed filling and the seed delivering; drawing, by the tractor, the paper band according to the set plant spacing; and, winding, by the second reel, the seed-on band after seed packaging and drying;
- when a number of delivered seeds counted by a counting sensor reaches a preset value, suspending operations of the seed metering device, the paper-band releasing and collecting mechanism, the paper-band glue spraying and sealing mechanism and the seed-on band drawing mechanism, then blowing, by the air from the seed emptying air-valve, the remaining seeds in the seed chamber to enter a remaining seed collector; and
- after the seed chamber is empty, performing and completing a seed replacement by the seeds in the bin chamber of another number entering the seed chamber, and repeating the process of packaging the seeds on the paper-band.

As a further implementation, if a condition of paper band breakage, full reel or paper band exhaustion is detected, suspending, by control mechanism, the operation of the packaging until the condition is fully repaired; and
- if one the of the plurality of suction holes fails to receive the seed, suspending, by the control mechanism, a movement of the paper band until a seed delivery signal is received by the control mechanism.

The beneficial effects of the present invention are as follows:

(1) According to the present invention, the arrangement of the seed metering baffle can reduce the horizontal speed of the seeds to zero, and the seeds are free falling motion only by gravity, effectively ensuring the accurate control of the seed spacing; with the use of the seed-on band drawing mechanism, the seeds can be evenly packaged on the degradable paper band, which can not only ensure the stability of the number of seeds in a single hole and the plant spacing, but also effectively reduce the missed sowing, replanting and seed loss rate, realize the automatic packaging of seeds, and greatly improve the breeding efficiency and accuracy.

(2) According to the present invention, the arrangement of the pneumatic interrupter enables only the suction hole at the lowest point of the seed metering device to be used for seed metering, so as to ensure accurate control of plant spacing, and the arrangement of the steel ball avoids wearing between the seed metering device and the pneumatic interrupter, thus improving the service life.

(3) According to the present invention, the arrangement of the paper-band glue spraying and sealing mechanism can spray glue on the paper band in advance, so as to facilitate the subsequent seed adhere to the paper band, ensure the fixation of the position of the seed after delivering, and improve the accuracy of the plant spacing control.

(4) According to the present invention, the drawing mechanism plays a role of drawing the seed-on band forward, controlling the forward speed of the seed-on band and providing assistance in gluing of the seed-on band. Meanwhile, the design of the sponge roller can reduce the damage caused by extrusion of seeds as much as possible, and cooperate with the drying function of the dryer to dry the wet seed-on band caused by spraying glue, which can effectively improve the stability of the paper-band packaging.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

Figure 1:
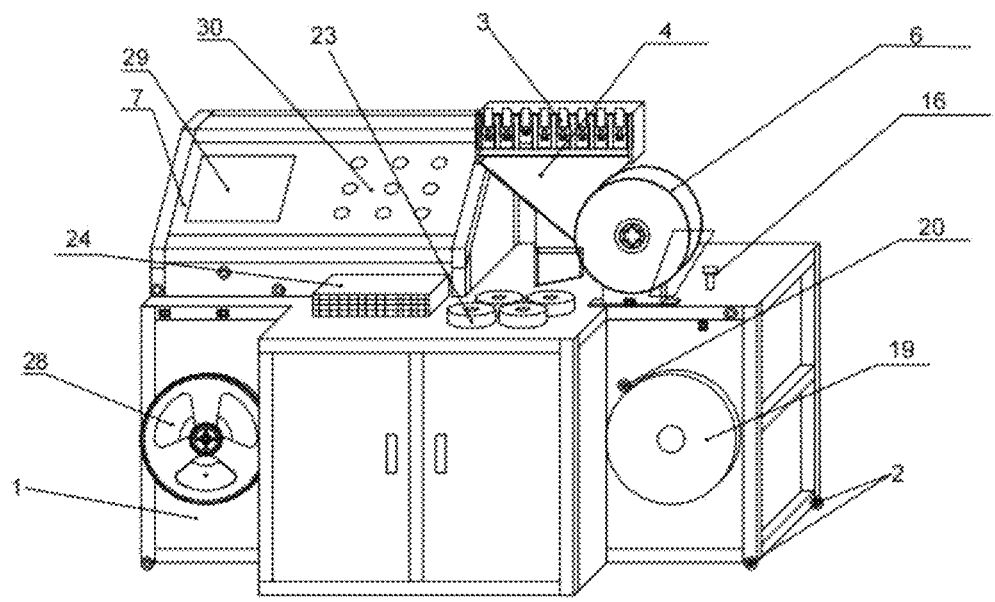
FIG. 1 is a schematic front view of a seed-on-paper-band packaging machine suitable for plot breeding according to one or more embodiments of the present invention.

In figures: the space or size between each other is exaggerated to show the position of each part, and the schematic diagram is only use for illustration;

wherein, 1—frame; 2—universal wheel; 3—seed bin; 4—seed chamber; 5—remaining seed collector; 6—seed metering device; 7—control mechanism; 8—seed emptying air—valve; 9—seed receiving device; 10—electrically controlled valves; 11—suction holes; 12—cavity; 13—housing; 14—first transmission shaft; 15—first servo motor; 16—spray gun; 17—first storage tank; 18—second storage tank; 19—first reel; 20—stopper; 21—second transmission shaft; 22—first monitoring sensor; 23—tractor; 24—dryer; 25—third transmission shaft; 26—second monitoring sensor; 27—third monitoring sensor; 28—second reel; 29—upper computer controller; 30—air pressure controller; 31—fourth transmission shaft; 33—third servo motor; 34—driving wheel; 35—driven wheel; 36—fixed plate; 37—mounting plate; 38—bearing seat; 39—paper band; 40—support frame; 41—counting sensor; 42—first baffle; 43—seed-on band; 601—second baffle; 602—rear cover; 603—front cover; 604—third baffle; 605—connecting rod; 606—limit nut; 607—sleeve; 608—steel ball.

DETAILED DESCRIPTION

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

As introduced in the Background, the existing air-suction single-seed metering device can only be used for solving the problems of missed seeding and repeated seeding; however, the seeds are easily thrown out due to inertia generated by following the rotation of the seed metering disk in the process of seed falling, cannot fall vertically under the action of gravity; thus, this device cannot be used for precision control of seeding spacing (i.e. plant spacing) in actual plot breeding work, and still needs to manually control plant spacing during seeding. In order to solve the technical problems mentioned above, the present invention provides a seed-on-paper-band packaging machine suitable for plot breeding and a working method thereof.

Example 1

In a typical example of the present invention, as shown in FIGS. 1-7, providing a seed-on-paper-band packaging machine suitable for plot breeding; the packaging machine comprises a frame 1 which plays an integral supporting role of the seed-on-paper-band packaging machine, wherein the frame 1 is made of aluminum alloy plate, and four corners of a bottom of the frame 1 are respectively provided with universal wheels 2 for assisting the movement of the frame 1.

Four main working mechanisms of a seed delivery mechanism, a paper-band glue spraying and sealing mechanism, a paper-band releasing and collecting mechanism and a seed-on band drawing mechanism, and a control mechanism 7 for controlling the work of the seed delivery mechanism, the paper-band glue spraying and sealing mechanism, the paper-band releasing and collecting mechanism and the seed-on band drawing mechanism, are provided on the frame 1.

Wherein, the control mechanism 7 is a control center of the whole packaging machine, and integrates an upper computer controller 29 and an air pressure controller 30.

The paper-band releasing and collecting mechanism consists of two oppositely arranged reels, one for releasing degradable paper band 39 and the other for winding up the paper band 39 containing seeds (i.e. seed-on band 43);

The seed-on band drawing mechanism is positioned between the two reels and is used for drawing movement, extrusion and drying of the paper band 39; the seed delivery mechanism is positioned above the paper-band releasing and collecting mechanism and between the two reels, and is mainly used for delivering seeds onto the paper band 39;

The paper-band glue spraying and sealing mechanism is also located above the paper-band releasing and collecting mechanism, and is located at one side of the seed delivery mechanism adjacent to the reel for paper band releasing, and is used for spraying glue on the paper band 39 in advance, so that subsequent seeds are adhered to the paper band 39.

Figure 2:
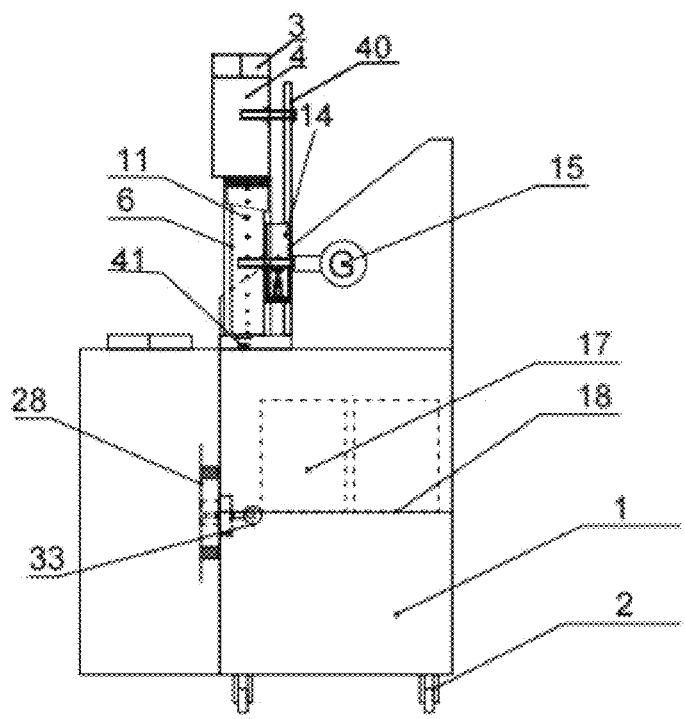
FIG. 2 is a schematic side view of the seed-on-paper-band packaging machine suitable for plot breeding according to one or more embodiments of the present invention.
Figure 3:
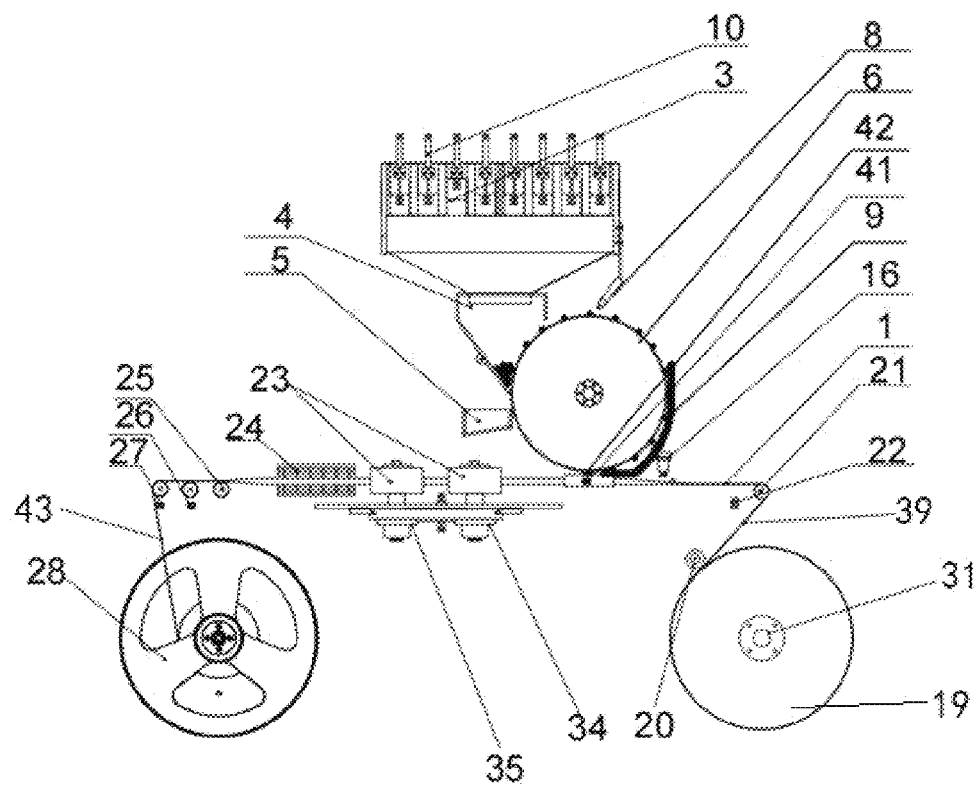
FIG. 3 is a schematic structural diagram of main working mechanisms inside the seed-on-paper-band packaging machine suitable for plot breeding according to one or more embodiments of the present invention.

Specifically, the seed delivery mechanism consists of a seed bin 3, a seed chamber 4, a remaining seed collector 5, a seed metering device 6, a seed emptying air-valve 8 and a seed receiving device 9. As shown in FIG. 2, a support frame 40 is fixedly mounted on the frame 1, and the seed bin 3, the seed chamber 4 and the seed metering device 6 are all mounted on the support frame 40.

The seed bin 3 and the seed chamber 4 together form a seed filling assembly for providing seeds to the seed metering device 6, the seed bin 3 is positioned right above the seed chamber 4, and seeds are stored in the seed bin 3.

The seed metering device 6 is of an air-suction type, and a plurality of suction holes 11 are arranged on an outer wall of the seed metering device 6 at intervals along the circumferential direction of the seed metering device 6. An inner space of the seed chamber 4 is communicated with the outer wall of the air-suction type seed metering device 6, and the air-suction type seed metering device 6 can adsorb seeds in the seed chamber 4 on the suction holes 11 of the outer wall.

The remaining seed collector 5 is positioned right below the seed chamber 4 and is used for collecting redundant seeds, the seed emptying air-valve 8 is positioned above the seed metering device 6 and is used for blowing air to the outer wall of the seed metering device 6 to blow off the seeds not adsorbed by the suction holes 11 in a blowing way, to avoid adhesion among seeds, so as to ensure that one seed is adsorbed at each suction hole 11, thereby facilitating accurate control of the number of seeds;

The seed receiving device 9 is positioned laterally below the seed metering device 6 for receiving the blown seeds and collecting redundant seeds.

Figure 4:
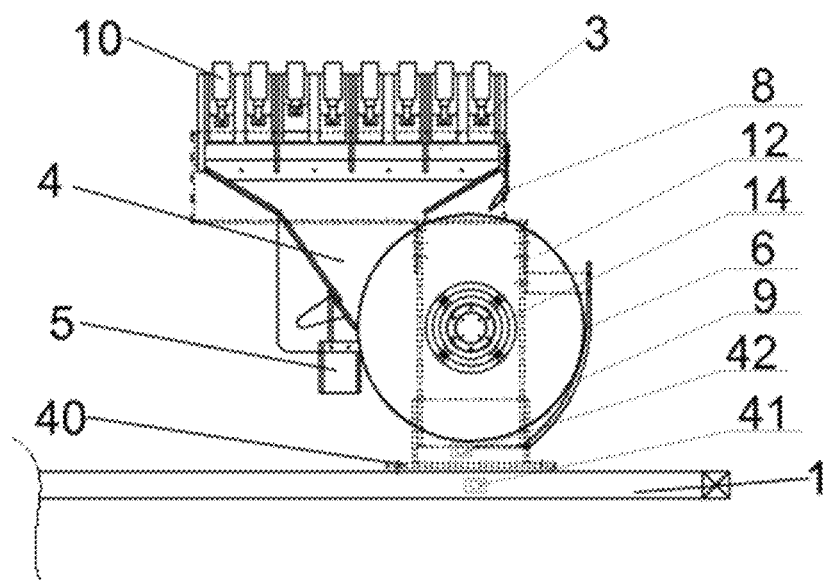
FIG. 4 is a schematic diagram of a seed delivery mechanism according to one or more embodiments of the present invention.
Figure 5:
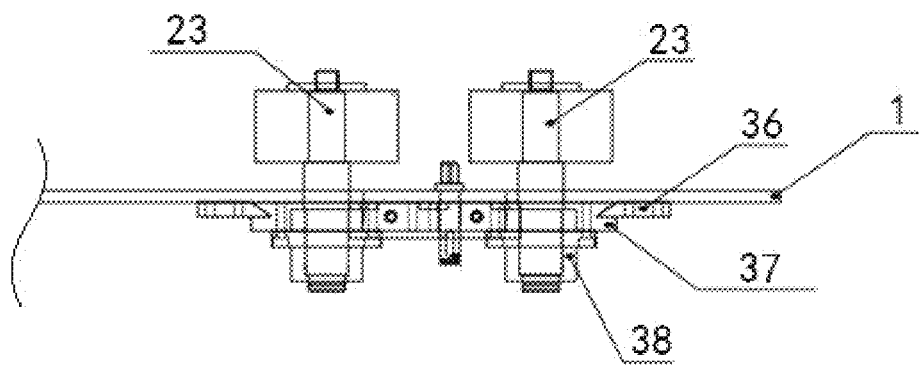
FIG. 5 is a schematic diagram of a seed-on band drawing mechanism according to one or more embodiments of the present invention.

As shown in FIG. 4, the seed bin 3 is composed of a plurality of bin chambers which are evenly arranged, each the bin chamber contains an electrically controlled valve 10, and each the bin chamber is used for storing different seeds, the electrically controlled valve 10 is used for controlling the connection between each the bin chamber and the seed chamber 4, so that different kinds of seeds can be provided into the seed chamber 4 according to different requirements.

The seed chamber 4 is located at the upper side of the seed metering device 6, and is fixedly mounted right below the seed bin 3 for receiving seeds discharged from the seed bin 3. The upper side of the seed metering device 6 is partially placed in the seed chamber 4, and the seed metering device 6 can absorb seeds in the seed chamber 4 on the suction holes 11 in the side wall during rotation.

The remaining seed collector 5 is positioned right below the seed chamber 4, and a valve is arranged at the bottom of the seed chamber 4, so that seeds in the seed chamber 4 can be discharged into the remaining seed collector 5 when seeds need to be replaced, so as to avoid mixing of seeds of different types in the seed chamber 4.

The seed emptying air-valve 8 is positioned above the seed metering device 6 and connected to an air source, and is used for blowing off adhered seeds, and seeds not adsorbed by the suction holes 11 can fall into the seed receiving device 9 positioned below the seed metering device 6 under the action of inertia, and the seed receiving device 9 and the remaining seed collector 5 are arranged opposite to each other on both sides of the seed metering device 6.

Figure 6:
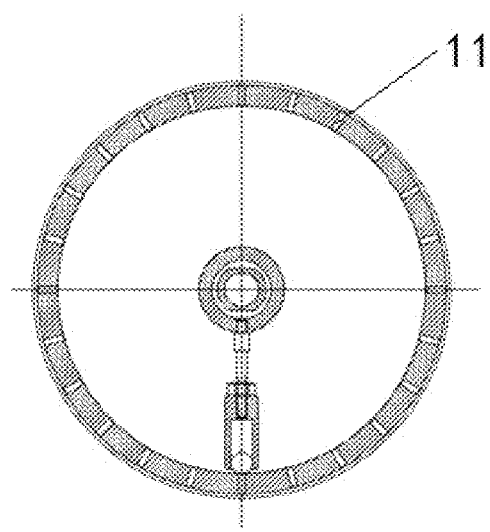
FIG. 6 is a schematic front view (perspective) of a seed metering device according to one or more embodiments of the present invention.
Figure 7:
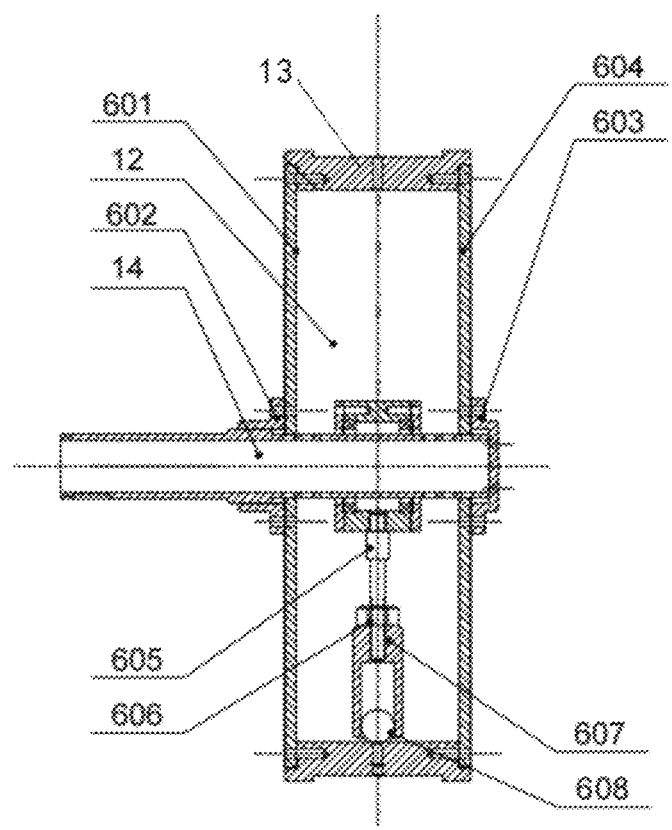
FIG. 7 is a schematic sectional view of the seed metering device according to one or more embodiments of the present invention.

The seed metering device 6 is of an air suction structure. As shown in FIGS. 6-7, the seed metering device 6 is composed of a disc-type housing 13 and a first transmission shaft 14. The housing 13 is composed of a second baffle plate 601, a third baffle plate 604 and an outer wall fixedly mounted between the second baffle plate 601 and the third baffle plate 604. The housing 13 contains a cavity 12 inside, and the plurality of suction holes 11 are arranged on the outer wall of the housing 13 at equal intervals along the circumferential direction thereof, and a size of each the suction hole 11 allows it to suck only one seed.

The housing 13 is fixedly mounted on the first transmission shaft 14, and the housing 13 and the first transmission shaft 14 are coaxially disposed. The first transmission shaft 14 passes through the housing 13. A rear cover 602 and a front cover 603 are respectively disposed on two sides of the housing 13, and the rear cover 602 and the front cover 603 are fixedly mounted on the first transmission shaft 14 for limiting the position of the housing 13. A first end of the first transmission shaft 14 far away from the housing 13 is connected with a first servo motor 15 mounted on the frame 1, and the first servo motor 15 is fixedly mounted on the frame 1, so that the housing 13 can be driven to rotate about an axis by the first servo motor 15.

A cavity 12 inside the housing 13 is connected to an air source arranged on the frame 1 and can be pumped to a negative pressure by the air source. The cavity 12 communicates with the suction holes 11, so that seeds can be adsorbed on the suction holes 11 under the action of the negative pressure.

A pneumatic interrupter is further arranged in the housing 13, so as to isolate the communication between the suction holes 11 and the cavity 12 through the pneumatic interruption, thereby realizing the discharge of seeds.

As shown in FIG. 7, the pneumatic interrupter consists of a connecting rod 605, a sleeve 607 and a steel ball 608, wherein the connecting rod 605 is rotatably connected with the first transmission shaft 14 through a bearing, the connecting rod 605 is positioned directly below the first transmission shaft 14, the axis of the connecting rod 605 is perpendicular to the axis of the first transmission shaft 14, the sleeve 607 is fixedly mounted at the bottom of the connecting rod 605, the bottom of the sleeve 607 is open, the steel ball 608 is arranged inside the sleeve 607 and can rotate in place under the restriction of the sleeve 607, thereby avoiding wearing between the steel ball 608 and the housing 13, so that one suction hole 11 can be blocked by the steel ball 608, and the communication between the suction hole 11 and the cavity 12 can be blocked.

Since the connecting rod 605 is rotatably connected with the first transmission shaft 14 through the bearing, the connecting rod 605 will not rotate around the axis following the first transmission shaft 14, and the connecting rod 605 will always maintain a vertical state under the action of gravity.

The connecting rod 605 is positioned right above the suction hole 11 at the lowest point of the seed metering device 6, and the sleeve 607 is coaxially arranged with the connecting rod 605, so as to ensure that the steel ball 608 is positioned right above the suction hole 11 at the lowest point of the seed metering device 6, so that only the suction hole 11 at the lowest point of the seed metering device 6 is used for seed metering at each time, so as to ensure accurate control of plant spacing.

In the present example, the position of the sleeve 607 is limited by the limit nut 606, and the limit nut 606 is mounted on the connecting rod 605 in a threaded manner. In other examples, the sleeve 607 can also be directly mounted on the connecting rod 605 in a threaded manner, and the specific mounting manner can be selected according to actual requirements, and excessive restrictions are not made here.

A first baffle plate 42 (i.e., seed metering baffle plate) is also fixedly mounted on the support frame 40. The first baffle plate 42 is located at one side of the suction hole 11 at the lowest point of the seed metering device 6 facing the rotation direction of the seed metering device 6, and the first baffle plate 42 is adjacent to the suction hole 11 at the lowest point of the seed metering device 6.

The first baffle 42 is made of sponge material. When the seed moving along with the seed metering device 6 reach the lowest point, the first baffle 42 will reduce the horizontal speed of the seed to zero. At this moment, the horizontal speed and vertical speed of the seed are both zero, so that the seed only move freely by gravity, effectively ensuring accurate control of the seed spacing.

In the present example, in order to further improve the precision control of the plant spacing, the seed metering device 6 is arranged at a position no more than 1 cm above the paper band 39, so that the seeds do free falling motion with zero initial velocity within a short distance, and the situation of large plant spacing error caused by too fast seed velocity will not occur, so as to ensure the accuracy and efficiency of the seed filling and seeding process.

A counting sensor 41 is further arranged right below the seed metering device 6, the counting sensor 41 is mounted on the frame 1 and used for counting the number of seeds discharged by the seed metering device 6, the counting sensor 41 is connected with the control mechanism 7 and used for counting the number of seed packages of a certain variety, and when the counting of the counting sensor 41 reaches a preset requirement, the control mechanism 7 receives a signal and performs seed emptying and replacement operation, and automatically packages the seeds of the next variety.

The paper-band glue spraying and sealing mechanism consists of a spray gun 16, a first storage tank 17 and a second storage tank 18, wherein the spray gun 16, the first storage tank 17 and the second storage tank 18 are all mounted on the frame 1, and the spray gun 16 is respectively connected with the first storage tank 17 and the second storage tank 18, wherein the first storage tank 17 stores colloid, and the second storage tank 18 stores lubricating oil.

The spray gun 16 is also connected to the control mechanism 7 for controlling the operation of the spray gun 16 and the automatic control of the amount of spray glue through the control mechanism 7, and is located above the paper-band releasing and collecting mechanism and on the side of the seed metering device 6 adjacent to the reel for paper-band releasing, for spraying glue on the paper band 39 in advance so that subsequent seeds adhere to the paper band 39.

The paper-band releasing and collecting mechanism comprises a first reel 19, a second reel 28 and a driving assembly for driving the first reel 19 and the second reel 28 to rotate, wherein the first reel 19 is used for releasing the original paper band, and the original paper band has been wound on the first reel 19, and the second reel 28 is used for winding the seed-on band 43.

Specifically, the first reel 19 is rotatably mounted on the frame 1 through a fourth transmission shaft 31, and the second reel 28 is connected to a third servo motor 33 mounted in the frame 1 through a fifth transmission shaft.

The first reel 19 is provided with a freely movable stopper 20 at the upper side thereof for regulating the position and rotation speed of the first reel 10, a second transmission shaft 21 and a first monitoring sensor 22 are arranged above the first reel 19, the second transmission shaft 21 is rotatably mounted on the frame 1, the paper band 39 is drew upward from the first reel 19 and bypasses the second transmission shaft 21, and then the paper band 39 horizontally passes directly below the spray gun 16 and the seed metering device 6 in turn to form a seed-on band 43. The seed-on band 43 passes through the seed-on band drawing mechanism, is positioned, guided and finally wound on the second reel 28 via the third transmission shaft 25. The first monitoring sensor 22 is responsible for monitoring whether the paper band 39 is broken or whether the paper band 39 in the first reel 19 is exhausted in real time.

The third transmission shaft 25 is provided with three, which are arranged horizontally and sequentially along the conveying direction of the seed-on band 43, the three third transmission shafts 25 are rotatably arranged on the frame 1, and a second monitoring sensor 26 and a third monitoring sensor 27 are arranged below the three third transmission shafts 25 for monitoring the position of the seed-on band 43, wherein the second monitoring sensor 26 is used for monitoring whether the seed-on band 43 is broken in real time, and the third monitoring sensor 27 is used for monitoring whether the second reel 28 is full in real time.

The seed-on band drawing mechanism comprises a tractor 23 and a dryer 24, wherein the tractor 23 comprises two groups of sponge rollers which are oppositely arranged, each group comprises two sponge rollers, and the seed-on band 43 passes between the two groups of sponge rollers.

Each the group of sponge rollers comprises a driving wheel 34 and a driven wheel 35, wherein the driving wheel 34 is correspondingly connected with one sponge roller in the group, the driven wheel 35 is correspondingly connected with another sponge roller in same the group, and the driving wheel 34 and the driven wheel 35 are driven by a belt. The driving wheel 34 is further connected with a second servo motor mounted inside the frame 1.

The driving wheel 34, the driven wheel 35 and the corresponding sponge rollers are connected through connecting shafts, the connecting shafts are fixedly mounted on the frame 1 through a mounting plate 37, the mounting plate 37 is fixedly connected with the frame 1 through bolts 36, etc., the connecting shafts are rotatably connected with the mounting plate 37 through bearings, and the bearings are mounted in bearing seats 38.

It can be understood that the driving wheel 34 and the driven wheel 35 may be gear shaft structures or other structures, and the specific structure can be determined according to actual design requirements, as long as the sponge roller can be driven to rotate.

The tractor 23 plays the role of drawing the seed-on band 43 forward, controlling the forward speed of the seed-on band 43, and providing assistance in gluing of the seed-on band 43, while the sponge roller structure is designed to minimize damage caused by seed extrusion.

The dryer 24 is adjacent to an output side of the tractor 23, and the seed-on band 43 output from the tractor 23 passes through the dryer 24 to be dried and then bypasses the third transmission shafts 25 for positioning and guiding. The dryer 24 is composed of an electric heating wire and a blower, and is responsible for drying the seed-on band 43 wet due to glue spraying, which can effectively improve the packaging stability of the paper band 39.

The dried seed-on band 43 is wound on the second reel 28 located on the frame 1 via three third transmission shafts 25. The second reel 28 is driven by the third servo motor 33, which is controlled by the upper computer controller 29, to realize efficient collection of the seed-on band 43.

The control mechanism 7 is the control center of the seed-on-paper-band packaging machine, responsible for controlling the power supply of the packaging system of the whole machine; responsible for controlling the start and stop of each the servo motor, providing kinetic energy for the seed metering device 6, the tractor 23 and the second reel 28, responsible for controlling the opening and closing of the electrically controlled valve 10 and the electrically controlled valve in the seed chamber 4, so as to realize automatic seed emptying, automatic seed changing and automatic collection of remaining seeds; receiving signals from the counting sensor 41 to ensure that a seed emptying and changing program is automatically started when the number of seed packages reaches a preset value; responsible for receiving various abnormal signals sent by each the monitoring sensor to carry out emergency treatment; responsible for controlling the negative pressure condition inside the seed metering device to ensure the normal operation of the seed metering device; responsible for controlling the output air pressure of the seed emptying air-valve 8 to reduce the replay phenomenon in the process of seed filling and seed delivering; and, responsible for controlling the glue spraying quantity and spray range of the spray gun 16, achieving accurate glue spraying and late sealing.

Example 2

Figure 8:
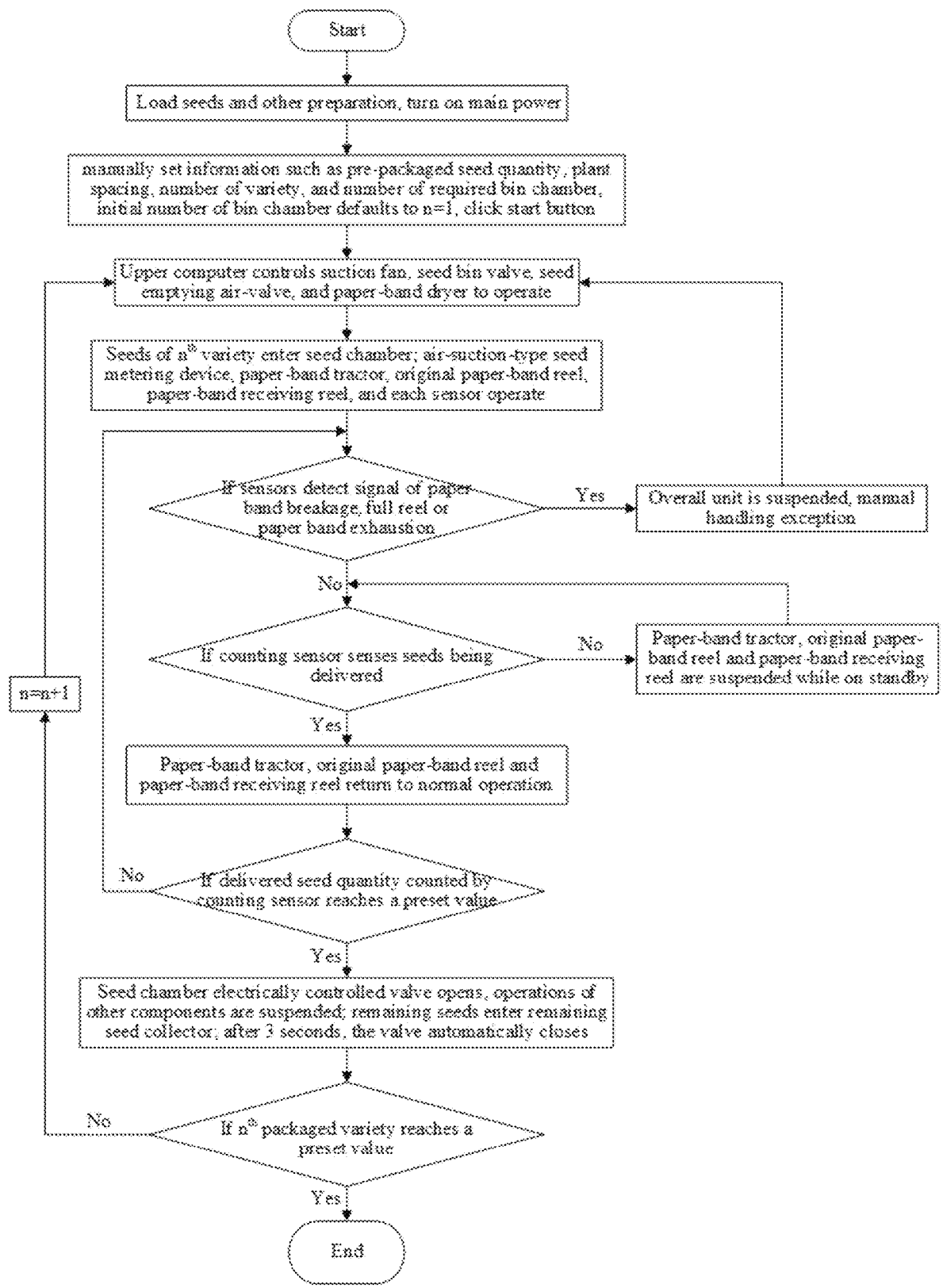
FIG. 8 is a flowchart of a working method of the seed-on-paper-band packaging machine according to one or more embodiments of the present invention.

In another typical example of the present invention, as shown in FIG. 8, proposing a working method of a seed-on-paper-band packaging machine suitable for plot breeding, specifically as follows:

Step one: loading seeds to be bred, according to the seeding requirement, into each bin chamber of the seed bin 3 in advance, wherein the seed types in each the bin chamber are different; drawing the paper band 39 upward from the first reel 19 and connecting the paper band 39 to the second reel 28 through the second transmission shaft 21, the spray gun 16, the seed metering device 6, the tractor 23, the dryer 24 and the third transmission shafts 25 in sequence; powering on the whole machine, and turning on the main power switch and the power switch in each the structure.

Step two: manually setting information such as the quantity of seeds to be packaged, the plant spacing, the number of a required bin chamber of the seed bin 3, and the variety number of packaged on the screen of the upper computer controller 29, and clicking the start button on the screen; wherein, an initial number for the bin chamber of the seed bin 3 defaults to n=1, and the numbers of remaining bin chambers are sequentially sorted according to the set order.

Step three: controlling, by the control mechanism 7, after the seeds enter the seed chamber 4, the electrically controlled valve 10 of the bin chamber corresponding to the number, the seed metering device 6, the tractor 23, the second reel 28, the spray gun 16, the dryer 24, the counting sensor 41 and each monitoring sensor to operate; wherein, performing, by the seed metering device 6, seed filling and seed delivering operations, drawing, by the tractor 23 the paper band 39 according to the plant spacing set in the step two, and winding up, by the second reel 28, the seed-on band 43 after seed packaging and drying.

Step four: especially if detecting, by the each monitoring sensor, the paper band 39 is broken, full reel or exhausted, controlling, by the control mechanism 7, to suspend the packaging work until the worker solves the issues; directly clicking the stop button on the screen of the upper computer controller 29 if it is necessary to manually suspend the packaging due to other factors; and the counting sensor 41 is responsible for uploading the seed quantity information to the upper computer controller 29 in real time, wherein if a certain suction hole 11 fails to suck seeds, the upper computer controller 29 will control the tractor 23 to pause moving forward until receiving a seed delivering signal. During the pause of the tractor 23, the first reel 19 and the second reel 28 are in a standby state.

Step five: after completing the seed packaging of the previous variety (i.e., when the number of seeds counted by the counting sensor 41 reaches a preset value), controlling, by the upper computer controller 29, the seed emptying air-valve 8, the seed metering device 6, the tractor 23, the first reel 19, the second reel 28, the spray gun 16, the counting sensor 41 and each monitoring sensor to pause according to a predetermined program; the electrically controlled valve of the seed chamber 4 is opened for the remaining seeds entering the remaining seed collector 5, and after three seconds, the electrically controlled valve of the seed chamber 4 is automatically closed, thus completing the seed emptying operation.

Step six: after the seed chamber 4 is empty, the electrically controlled valve of the seed chamber 4 is closed, the electrically controlled valve 10 of the seed chamber 3 is opened, seeds in another chamber (number n+1) enter the seed chamber 4 to complete the seed replacement, then continuing the cycle of steps three, four and five until the seed quantity of packaged varieties set in the step two is completed, and finally turning off all the power supplies.

The foregoing descriptions are merely preferred embodiments of the present invention but are not intended to limit the present invention. A person skilled in art may make various alterations and variations to the present invention. Any modification, equivalent replacement, or improvement made within the spirit and principle of the present invention shall fall within the protection scope of the present invention.

The invention claimed is:

1. A seed-on-paper-band packaging machine suitable for plot breeding, comprising:
    a seed delivery mechanism, comprising a seed filling assembly and an air-suction-type seed metering device connected sequentially, wherein a plurality of suction holes are arranged on an outer wall of the seed metering device at equal intervals along a circumferential direction of the seed metering device; a seed metering baffle is arranged on one side of one suction hole of the plurality of suction holes that is at a lowest point of the seed metering device facing a rotating direction of the seed metering device, and is configured to block seeds and reduce a speed of the seeds in a horizontal direction to zero;
    a paper-band releasing and collecting mechanism, being positioned below the seed delivery mechanism, comprising a first reel used for releasing a paper band and a second reel used for winding a seed-on band;
    a paper-band glue spraying and sealing mechanism, being positioned above the paper-band releasing and collecting mechanism and at a side of the seed delivery mechanism adjacent to the first reel, and being configured to spray glue onto the paper band;
    a seed-on band drawing mechanism, being positioned between the first reel and the second reel, and being configured to draw, extrude and dry the seed-on band; and
    a frame having wheels arranged at a bottom of the frame; wherein
    the seed filling assembly comprises a seed bin and a seed chamber, wherein the seed bin comprises a plurality of bin chambers, each of the plurality of bin chambers is respectively provided with an electrically controlled valve; a bottom of the seed bin communicates with the seed chamber, and part of the outer wall of the seed metering device is positioned in the seed chamber;
    a pneumatic interrupter is arranged inside the seed metering device, the pneumatic interrupter is rotatably mounted on a transmission shaft of the seed metering device through a bearing, and the pneumatic interrupter is contacted with the suction hole at the lowest point of the seed metering device through a steel ball capable of rotating in situ, to block a communication between the suction hole at the lowest point of the seed metering device and an inner cavity of the seed metering device;
    the seed-on band drawing mechanism comprises a tractor and a dryer arranged sequentially, wherein the tractor comprises two groups of sponge rollers arranged oppositely about the seed-on band, and the two groups of sponge rollers are driven by a servo motor to draw and extrude the seed-on band, and provide assistance in gluing of the seed-on band; and
    the seed metering device is arranged at a position no more than 1 cm above the paper band, and is configured to cooperate with the draw speed of the seed-on band drawing mechanism to evenly package the seeds, on the paper band.

2. The packaging machine according to claim 1, wherein the frame is further provided with a control mechanism for controlling an operation of the seed delivery mechanism, the paper-band releasing and collecting mechanism, the paper-band glue spraying and sealing mechanism, and the seed-on band drawing mechanism, a plurality of sensors configured for monitoring a seed delivering quantity and a state of the seed-on band drawing mechanism.

3. The packaging machine according to claim 1, wherein a remaining seed collector is arranged below the seed chamber, an electrically controlled valve is arranged at a bottom of the seed chamber, a seed emptying air-valve for blowing air to the outer wall of the seed metering device is arranged above the seed metering device, a seed receiving device is arranged below a side of the seed metering device, and an inner cavity of the seed metering device and the seed emptying air-valve are connected with an air source.

4. The packaging machine according to claim 1, wherein the second reel is driven by a servo motor, the paper band released from the first reel is wound up by the second reel after the seeds delivered on, and the first reel and the second reel are both provided with a transmission shaft for guiding and positioning the paper band and a sensor for monitoring the state of the paper band.

5. A working method of the seed-on-paper-band packaging machine suitable for plot breeding according to claim 1, comprising:
 placing seeds of different kinds correspondingly in numbered bin chambers;
 drawing the paper band upward from the first reel and sequentially passing through the paper-band glue spraying and sealing mechanism, the seed metering device, the tractor and the dryer, and then connecting the paper band to the second reel;
 manually setting, on a screen of a control mechanism, a seed quantity, a seed spacing and the number of a required bin chambers of the seed bin to accommodate each variety of seeds to be packaged;
 opening, by the control mechanism, the electrically controlled valve of the bin chamber of a corresponding number to enable the seeds to enter the seed chamber; performing, by the seed metering device, the seed filling and the seed delivering; drawing, by the tractor, the paper band according to the set plant spacing; and, winding, by the second reel, the seed-on band after seed packaging and drying;
 when a number of delivered seeds counted by a counting sensor reaches a preset value, suspending operations of the seed metering device, the paper-band releasing and collecting mechanism, the paper-band glue spraying and sealing mechanism and the seed-on band drawing mechanism, and then making, by opening seed emptying air-valve, remaining seeds in the seed chamber enter a remaining seed collector; and
 after the seed chamber is empty, performing and completing a seed replacement by the seeds in the bin chamber of another number entering the seed chamber, and repeating the process of packaging the seeds on the paper-band.

6. The working method according to claim 5, wherein if a condition of paper band breakage, full reel or paper band exhaustion is detected by sensors, suspending, by control mechanism, the operation of the packaging until the condition is fully repaired; and
 if failure of one of the plurality of suction holes to receive the seeds is detected by a sensor, suspending, by the control mechanism, a movement of the paper band until a seed delivery signal is received by the control mechanism.

7. A working method of the seed-on-paper-band packaging machine suitable for plot breeding according to claim 2, comprising:
 placing seeds of different kinds correspondingly in numbered bin chambers;
 drawing the paper band upward from the first reel and sequentially passing through the paper-band glue spraying and sealing mechanism, the seed metering device, the tractor and the dryer, and then connecting the paper band to the second reel;
 manually setting, on a screen of a control mechanism, a seed quantity, a seed spacing and the number of the required bin chambers of the seed bin to accommodate each variety of seeds to be packaged;
 opening, by the control mechanism, the electrically controlled valve of the bin chamber of the corresponding number to enable the seeds to enter the seed chamber; performing, by the seed metering device, the seed filling and the seed delivering; drawing, by the tractor, the paper band according to the set plant spacing; and, winding, by the second reel, the seed-on band after seed packaging and drying;
 when the number of delivered seeds counted by a counting sensor reaches a preset value, suspending operations of the seed metering device, the paper-band releasing and collecting mechanism, the paper-band glue spraying and sealing mechanism and the seed-on band drawing mechanism, and then making, by opening seed emptying air-valve, remaining seeds in the seed chamber enter the remaining seed collector; and
 after the seed chamber is empty, performing and completing a seed replacement by seeds in the bin chamber of another number entering the seed chamber, and repeating the process of packaging the seeds on the paper-band.

8. A working method of the seed-on-paper-band packaging machine suitable for plot breeding according to claim 3, comprising:
 placing seeds of different kinds correspondingly in numbered bin chambers;
 drawing the paper band upward from the first reel and sequentially passing through the paper-band glue spraying and sealing mechanism, the seed metering device, the tractor and the dryer, and then connecting the paper band to the second reel;
 manually setting, on a screen of a control mechanism, a seed quantity, a seed spacing and the number of required bin chambers of the seed bin to accommodate each variety of seeds to be packaged;
 opening, by the control mechanism, the electrically controlled valve of the bin chamber of the corresponding number to enable the seeds to enter the seed chamber; performing, by the seed metering device, the seed filling and the seed delivering; drawing, by the tractor, the paper band according to the set plant spacing; and, winding, by the second reel, the seed-on band after seed packaging and drying;
 when the number of delivered seeds counted by a counting sensor reaches a preset value, suspending operations of the seed metering device, the paper-band releasing and collecting mechanism, the paper-band glue spraying and sealing mechanism and the seed-on band drawing mechanism, and then making, by opening seed emptying air-valve, remaining seeds in the seed chamber enter the remaining seed collector; and
 after the seed chamber is empty, performing and completing a seed replacement by seeds in the bin chamber of another number entering the seed chamber, and repeating the process of packaging the seeds on the paper-band.

9. A working method of the seed-on-paper-band packaging machine suitable for plot breeding according to claim 4, comprising:
 placing seeds of different kinds correspondingly in numbered bin chambers; drawing the paper band upward from the first reel and sequentially passing through the paper-band glue spraying and sealing mechanism, the seed metering device, the tractor and the dryer, and then connecting the paper band to the second reel;
 manually setting, on a screen of a control mechanism, a seed quantity, a seed spacing and the number of required bin chambers of the seed bin to accommodate the number of each variety of seeds to be packaged;

opening, by the control mechanism, the electrically controlled valve of the bin chamber of the corresponding number to enable the seeds to enter the seed chamber; performing, by the seed metering device, the seed filling and the seed delivering; drawing, by the tractor, the paper band according to the set plant spacing; and, winding, by the second reel, the seed-on band after seed packaging and drying;

when the number of delivered seeds counted by a counting sensor reaches a preset value, suspending operations of the seed metering device, the paper-band releasing and collecting mechanism, the paper-band glue spraying and sealing mechanism and the seed-on band drawing mechanism, and then making, by opening seed emptying air-valve, remaining seeds in the seed chamber enter the remaining seed collector; and after the seed chamber is empty, performing and completing a seed replacement by seeds in the bin chamber of another number entering the seed chamber, and repeating the process of packaging the seeds on the paper-band.

* * * * *